US010685027B2

(12) United States Patent
Chernyak

(10) Patent No.: US 10,685,027 B2
(45) Date of Patent: Jun. 16, 2020

(54) SEARCH SYSTEM

(71) Applicant: Microsoft Technology Licensing, LLC, Redmond, WA (US)

(72) Inventor: Michael Chernyak, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 623 days.

(21) Appl. No.: 14/925,828

(22) Filed: Oct. 28, 2015

(65) Prior Publication Data

US 2017/0124156 A1    May 4, 2017

(51) Int. Cl.
*G06F 16/2457* (2019.01)
*G06F 16/248* (2019.01)
*G06F 16/25* (2019.01)
*G06F 16/22* (2019.01)
*G06F 16/9535* (2019.01)
*G06Q 50/00* (2012.01)
*G06F 16/33* (2019.01)

(52) U.S. Cl.
CPC .... *G06F 16/24575* (2019.01); *G06F 16/2272* (2019.01); *G06F 16/248* (2019.01); *G06F 16/252* (2019.01); *G06F 16/3338* (2019.01); *G06F 16/9535* (2019.01); *G06Q 50/01* (2013.01)

(58) Field of Classification Search
CPC ......... G06F 17/30528; G06F 17/30336; G06F 17/30554; G06F 17/30867; G06F 16/24575; G06F 16/3338; G06F 16/2272; G06F 16/9535; G06F 16/248; G06F 16/252

USPC .......................................... 707/706
See application file for complete search history.

(56) References Cited

U.S. PATENT DOCUMENTS

| | | |
|---|---|---|
| 2008/0301112 A1 | 12/2008 | Wu |
| 2010/0070506 A1 | 3/2010 | Whang et al. |
| 2014/0280002 A1* | 9/2014 | Ganesh ............. G06F 17/30864 707/706 |
| 2017/0083523 A1* | 3/2017 | Philip ................. G06F 17/3053 |

OTHER PUBLICATIONS

"International Application Serial No. PCT/US2016/058797, International Search Report dated Jan. 23, 2017". 4 pgs.
"International Application Serial No. PCT/US2016/056797, Written Opinion dated Jan. 23, 2017", 8 pgs.
Fox, E, et al., "Inverted Files", Information Retrieval: Data Structures and Algorithm, Prentice-Hall, Upper Saddle River, NJ, USA, (Jan. 1, 1992), 28-43.

* cited by examiner

*Primary Examiner* — Joshua Bullock
(74) *Attorney, Agent, or Firm* — Schwegman Lundberg & Woessner, P.A.

(57) ABSTRACT

A search system is provided with an on-line social network system. When a user of the on-line social network system requests a search, the search system examines a member profile representing the user in the on-line social network system and derives, from the member profile, additional terms to be included into the search request together with the user-supplied search terms. The resulting query is processed by applying the AND operator to the user-supplied terms and a weighted OR operator to the additional terms derived from the member profile. The search results obtained by executing the query are made available to the requesting user.

16 Claims, 4 Drawing Sheets

SEARCH SYSTEM

TECHNICAL FIELD

This application relates to the technical fields of software and/or hardware technology and, in one example embodiment, to system and method to optimize search process in an on-line social network system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
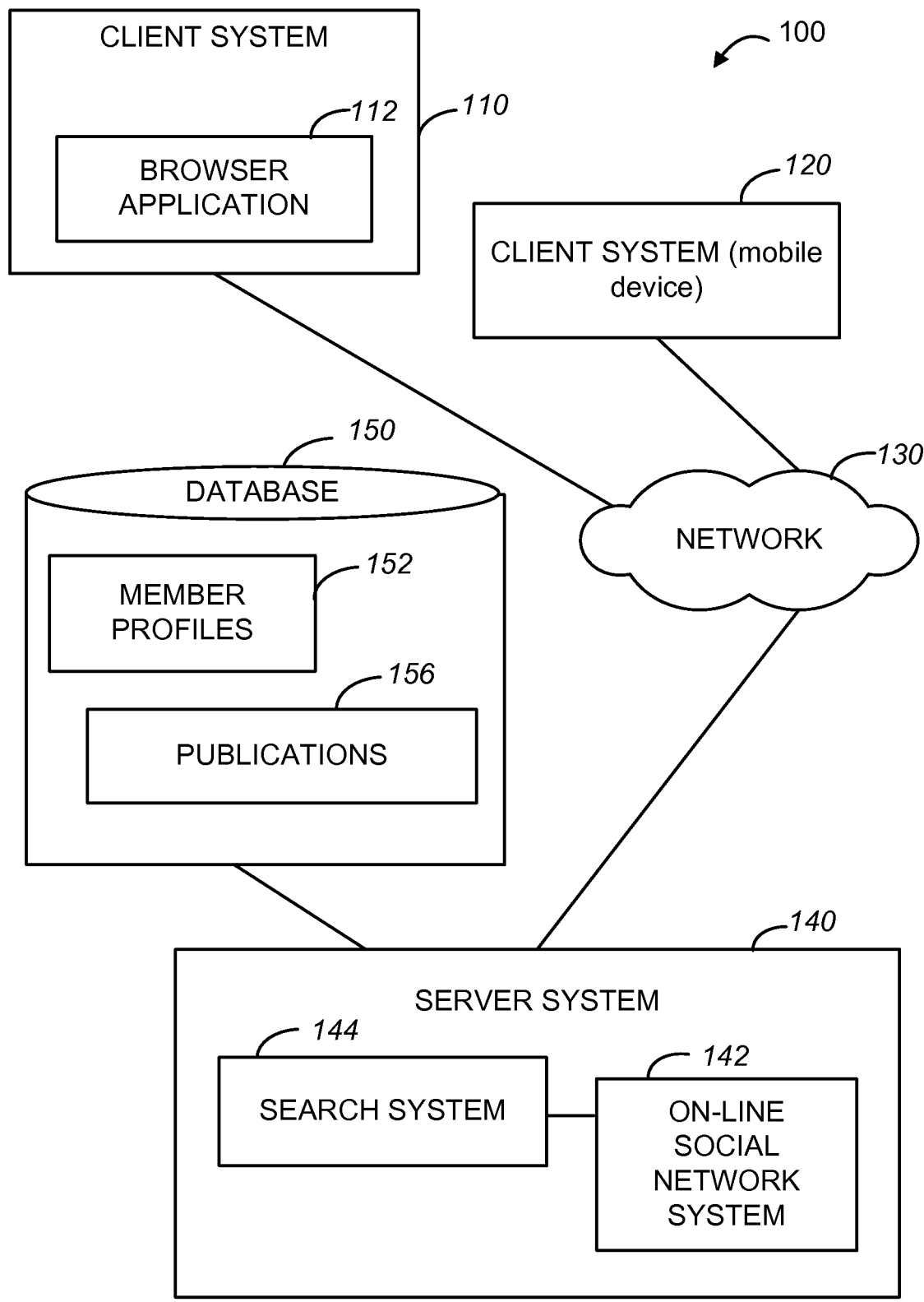
FIG. 1 is a diagrammatic representation of a network environment within which an example method and system to optimize search process in an on-line social network system may be implemented.

A method and system to optimize search process in an on-line social network system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies. A member profile may be associated with social links that indicate that member's connection to other members of the social network. Any two members of a social network may indicate their mutual willingness to be "connected" in the context of the social network, in that they can view each other's profiles, profile recommendations and endorsements for each other and otherwise be in touch via the social network. Members who are connected in the context of a social network may be termed each other's "connections."

Various terms that may be included in member profiles to characterize or describe respective associated members may be stored in the on-line social system as so-called "profile terms." The profile terms may be categorized based on their respective use in member profiles. For example, one category of profile terms may be "skills" that includes terms such as "statistical modeling," "cloud computing," patent prosecution," etc. that could be used to describe a member's professional skills. Another category, for example, may include terms representing geographic locations.

An on-line social network system, in one example embodiment, maintains information about various organizations, as well as so-called job postings. A job posting, for the purposes of this description is an electronically stored entity that includes information that an employer may post with respect to a job with a particular organization. The information in a job posting may include, e.g., the name of the industry, the name of the job position, terms reflecting required and/or desirable skills, the geographic location of the job, the name of the organization, etc. An on-line social network system may also store or have access to various other electronic publications, such as, e.g., news articles, technical and scientific papers, images, etc.

An on-line social network system may include a search engine configured to process search requests from users with respect to various documents stored or accessible by the on-line social network system. In the context of an on-line social network system, a document or a publication may be understood as any content item stored in or accessible by the on-line social network system, such as, e.g., news articles, technical and scientific papers, job postings, documents representing companies, etc. In order to increase speed and performance in finding relevant documents in response to a search query, a search engine may utilize an inverted index, which is an index data structure comprising records, where each record stores a mapping of a content term (also referred to as merely "term") to identifiers (or pointers to the identifiers) of those documents that include that content term. It will be noted that a content term may be present in a document either explicitly or implicitly. Some examples of determining that a content term is implicitly present in a document are discussed further below.

An example of a section from an inverted index is shown in Table 1 below.

TABLE 1

| Term 1 | Pointer to Doc_ID 1 | ... | Pointer to Doc_ID m |
|---|---|---|---|
| ... | ... | ... | ... |
| Term n | Pointer to Doc_ID 1 | ... | Pointer to Doc_ID n |

In one example embodiment, a so called augmented search and indexing system is provided to selectively augment the inverted index to include additional terms from the profile terms that characterize or describe members of the on-line social networking system. For example, originally, the inverted search index may lack terms "San Francisco Bay Area," "software architect," or "data ninja." The inverted index may then be augmented with these terms if these terms are in the set of the profile terms stored in the on-line social networking system. In one embodiment, the terms from the profile terms, with which to augment the inverted search index, may be selected based on how frequently the respective terms appear in the member profiles. In some embodiments, the inverted index is augmented with all terms from the set of the profile terms stored in the on-line social networking system. The augmented search and indexing system may also utilize an analyzer software module or a lookup table or both to translate one term (that could be an alpha-numeric string consisting of one or more words) into another term, and include into the inverted index the translated term. For example, the term "software engineer" may be translated into the term "software developer."

As mentioned above, each record in the inverted index stores a mapping of a content term to identifiers of documents that include, either explicitly or implicitly, that content term. One or more terms that are not found explicitly in a document but are nonetheless descriptive of or relevant to a document may be identified by, e.g., consulting further data stored in the on-line social network system or monitoring events in the on-line social network system that are associated with the document. For example, a news article about a software company located in Mountain View, Calif. may not include the phrase "San Francisco Bay Area." The augmented search and indexing system may be configured to identify a string in the article as company name, access information about that company that is stored in the on-line social network system, and, based on that information, identify the news article as implicitly including the term "San Francisco Bay Area." In the inverted index, the term "San Francisco Bay Area" would then be mapped to the identification of that news article. Another example is where a scientific paper has entered the on-line social network system by a member posting or sharing this publication in the on-line social network system. If monitoring of events associated with this shared publication indicates that this scientific paper is read, commented on, further shared, etc., by members that list certain professional skills in their profiles (e.g., "nuclear physics," "bioinformatics," or "statistical modeling"), this publication would be identified as implicitly including the phrases representing professional skills of members that have been most active in engaging with the article. The content terms corresponding to those skills would then be mapped, in the inverted index, to the identification of that scientific paper.

When a member requests a search in the on-line social network system, the augmented search and indexing system may include, into the query, additional search terms with the search terms entered by the member, prior to executing the search request. These additional terms are selected from the profile terms included in the member profile of the member. In one embodiment, the augmented search and indexing system may select one or more terms from the skills category, e.g., those phrases in the member profile that represent most prominent professional skills of the member in the member profile. The augmented search and indexing system may also select, as an additional search term, a phrase representing geographic location of the member. For example, the augmented search and indexing system may either select a phrase from the member profile that is associated with geographic location category. Alternatively, or additionally, the augmented search and indexing system may be configured to derive the geographic location from various information present in the member profile, such as, e.g., from the information indicating the member's current place of employment. In another embodiment, the augmented search and indexing system may utilize past activity of a member to derive additional search terms. For example, in the context of a job search, additional search terms may be derived from entities representing companies that were searched for by the member at an earlier time or based on characteristics of companies that were searched for by the member.

The resulting query includes additional terms and can be processed using various operators, such as, for example, a weighted OR operation (denoted as wOR). Each of the additional terms is assigned a weight by the augmented search and indexing system, e.g., based on their respective categories. Thus, for example, the terms from the skills category (the phrases representing professional skills of a member) may be assigned a first weight value, while the terms from location category (the phrases representing geographic location that is relevant to the member) may be assigned a second weight value. A weight assigned to a term indicates the relative importance of the term among other terms in the corpus.

An example query that includes two search terms entered by the user ("software engineer" and "Java") and two additional search terms selected by the augmented search and indexing system ("San Francisco Bay Area," "machine learning," linux, senior, and hadoop) is shown below.

("software engineer" AND "Java") AND
 (wOR(threshold_value("San Francisco Bay Area,"[w1]
  "machine learning"[w2], linux[w3], senior[w4],
  hadoop[w5]), wherein the sum of the weights $w_1, \ldots w_5$ must be greater than the threshold_value.

In response to the query shown above, the search engine retrieves documents that are mapped to the terms "software engineer" and "Java" in the inverted index, and then further filters the retrieved results based on the presence in those documents any of the terms selected by the augmented search and indexing system. An example search system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network system 142. Member profiles and related information may be stored in a database 150 as member profiles 152. The database 150 also stores content items as publications 154. As explained above, a publication (also referred to as a document) is to be understood as any content item stored in or accessible by the on-line social network system 142, such as, e.g., news articles, technical and scientific papers, job postings, documents representing companies, etc.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a search system 144. The search system 144 may be configured to optimize the search process performed in the on-line social network system 142 by leveraging various features that can be found in member profiles maintained by the on-line social network system 142, using the approaches described above. In one embodiment, search system 144 augments the inverted search index, which is used for search optimization, with features from member profiles maintained by the on-line social network system 142. When a user of the on-line social network system 142 requests a search, the search system 144 examines a member profile representing the user in the on-line social network system and derives, from the member profile, additional terms to be included into the search request together with the user-supplied search terms. The resulting query is processed by applying the AND operator to the user-supplied terms and a weighted OR operator to the additional terms derived from the member profile. The search results obtained by executing the query are made available to the requesting user. An example search system 144, which may also be referred to as augmented search and indexing system, is illustrated in FIG. 2.

Figure 2:
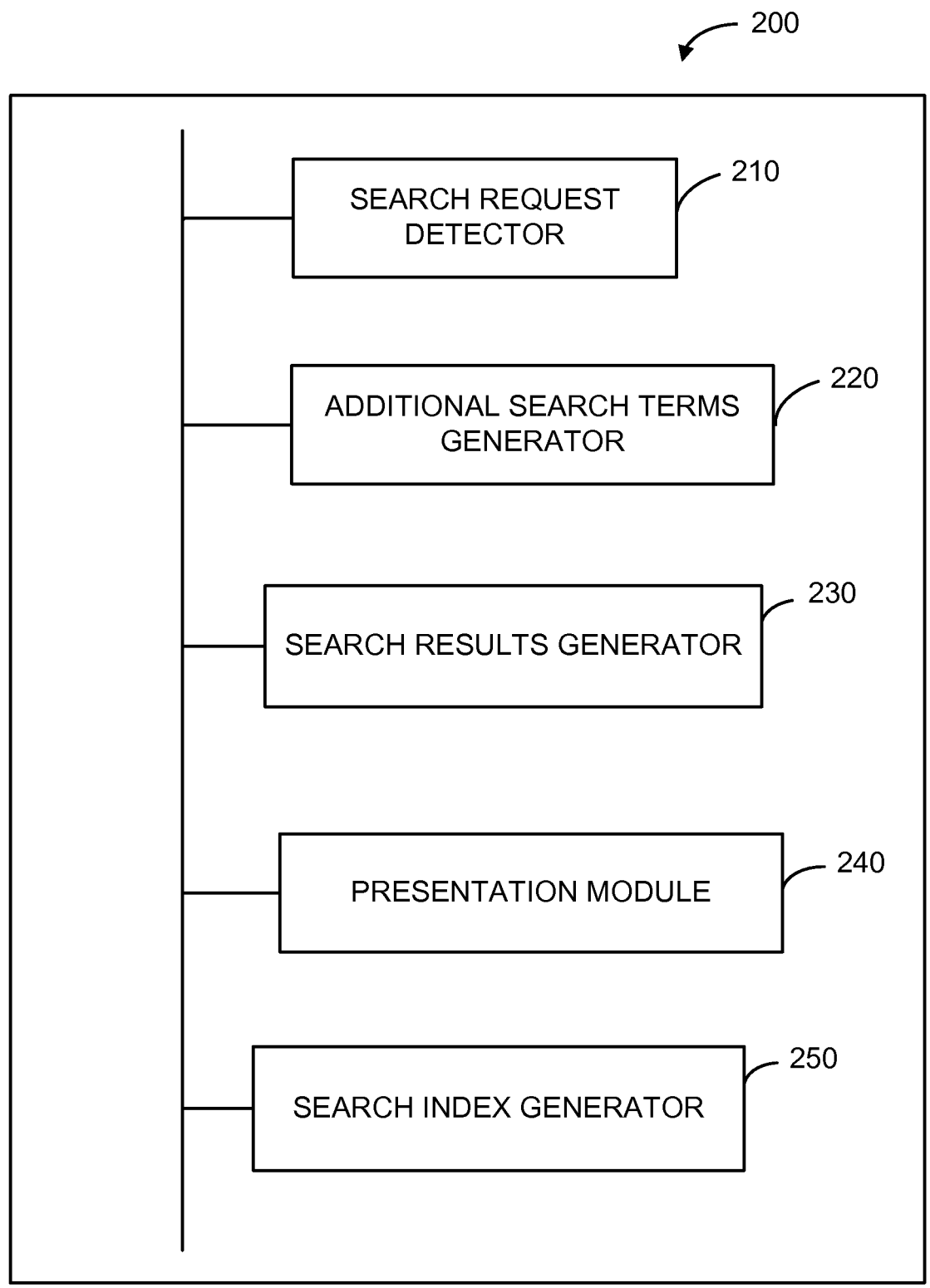
FIG. 2 is block diagram of a system to optimize search process in an on-line social network system, in accordance with one example embodiment.

FIG. 2 is a block diagram of a system 200 to optimize search process in an on-line social network system 142 of FIG. 1. As shown in FIG. 2, the system 200 includes a search request detector 210, an additional search terms generator 220, a search results generator 230, and a presentation module 240. The search request detector 210 is configured to detect a search request from a member of the of the on-line social network system 142 of FIG. 1. The search request includes one or more user-supplied search terms. The additional search terms generator 220 is configured to derive, from a member profile representing the member in the on-line social network system 142, one or more additional search terms. As described above, an additional search term selected for inclusion into the user's search request represent a characteristic of the member, such as e.g., a professional skill, geographic location, professional seniority, etc. The search results generator 230 is configured to process the search request based on the one or more user-supplied terms and the one or more additional terms, utilizing an inverted search index. The search results generator 230 processes the search request by applying a weighted OR operator to the one or more additional search terms, using respective weights assigned to the additional search terms, as described above. The presentation module 240 is configured to cause displaying of the one or more search results produced by the search results generator 230 on a display device of the requesting user. As mentioned above, the search results may include job postings, news articles, technical and scientific papers, etc.

Also shown in FIG. 2 is a search index generator 250. The search index generator 250 is configured to add one or more features from the member profiles maintained by the on-line social network system 142 into the inverted search index as content terms. As explained above, each content term from the inverted search index is mapped to identifications of those documents stored in the on-line social network system that include the content term, whether explicitly or implicitly. Some operations performed by the system 200 may be described with reference to FIG. 3.

Figure 3:
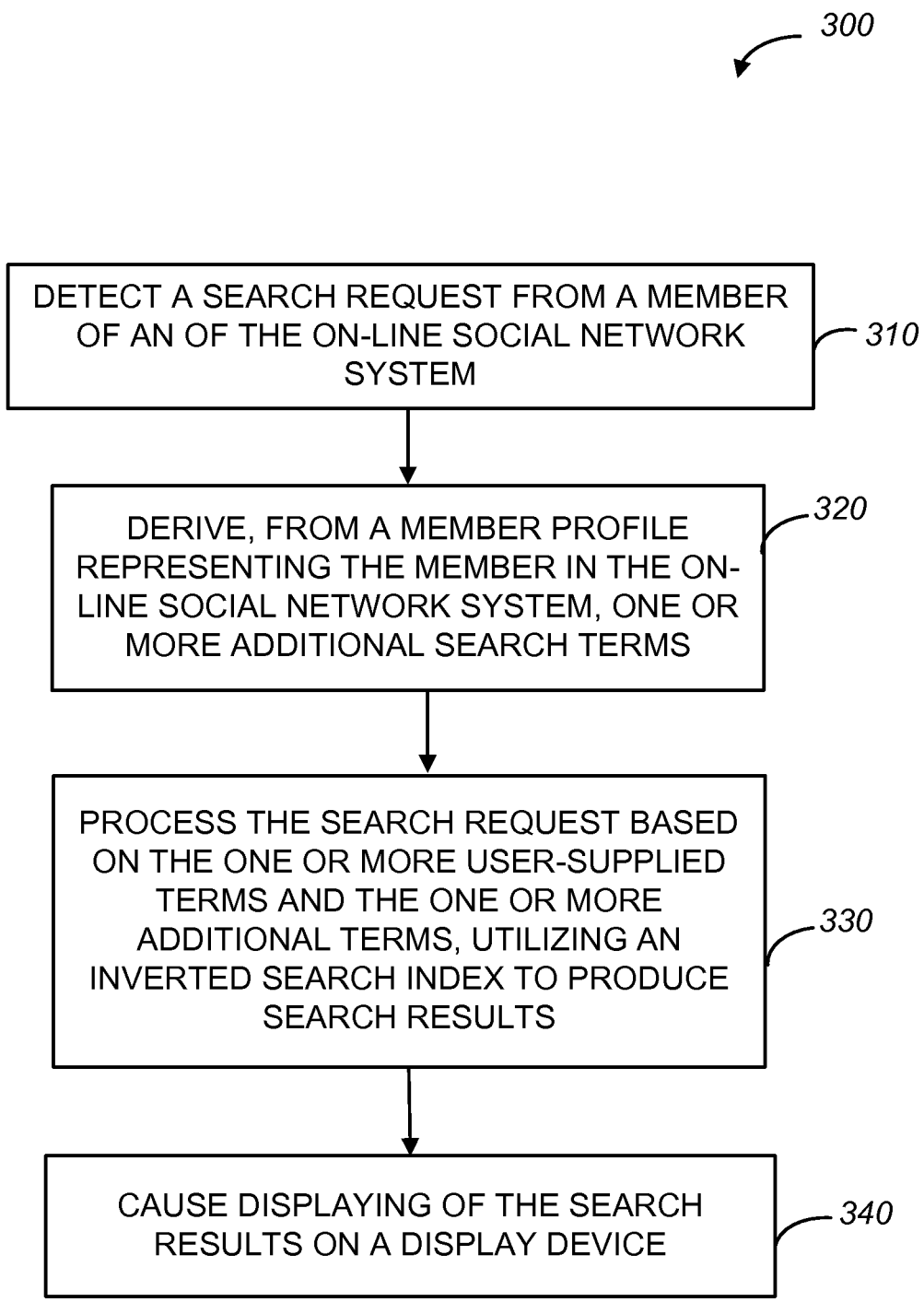
FIG. 3 is a flow chart illustrating a method to optimize search process in an on-line social network system, in accordance with an example embodiment.

FIG. 3 is a flow chart of a method 300 to optimize search process in an on-line social network system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the search request detector 210 of FIG. 2 detects a search request from a member of the of the on-line social network system 142 of FIG. 1. The search request includes one or more user-supplied search terms. At operation 320, the additional search terms generator 220 of FIG. 2 derives, from a member profile representing the member in the on-line social network system 142, one or more additional search terms. As described above, an additional search term selected for inclusion into the user's search request represent a characteristic of the member, such as e.g., a professional skill, geographic location, professional seniority, etc. The search results generator 230 processes the search request based on the one or more user-supplied terms and the one or more additional terms, utilizing an inverted search index, to produce search results, at operation 330. At operation 340, the presentation module 240 of FIG. 2 cause displaying of the one or more search results produced by the search results generator 230 on a display device of the requesting user. As mentioned above, the search results may include job postings, news articles, technical and scientific papers, etc.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
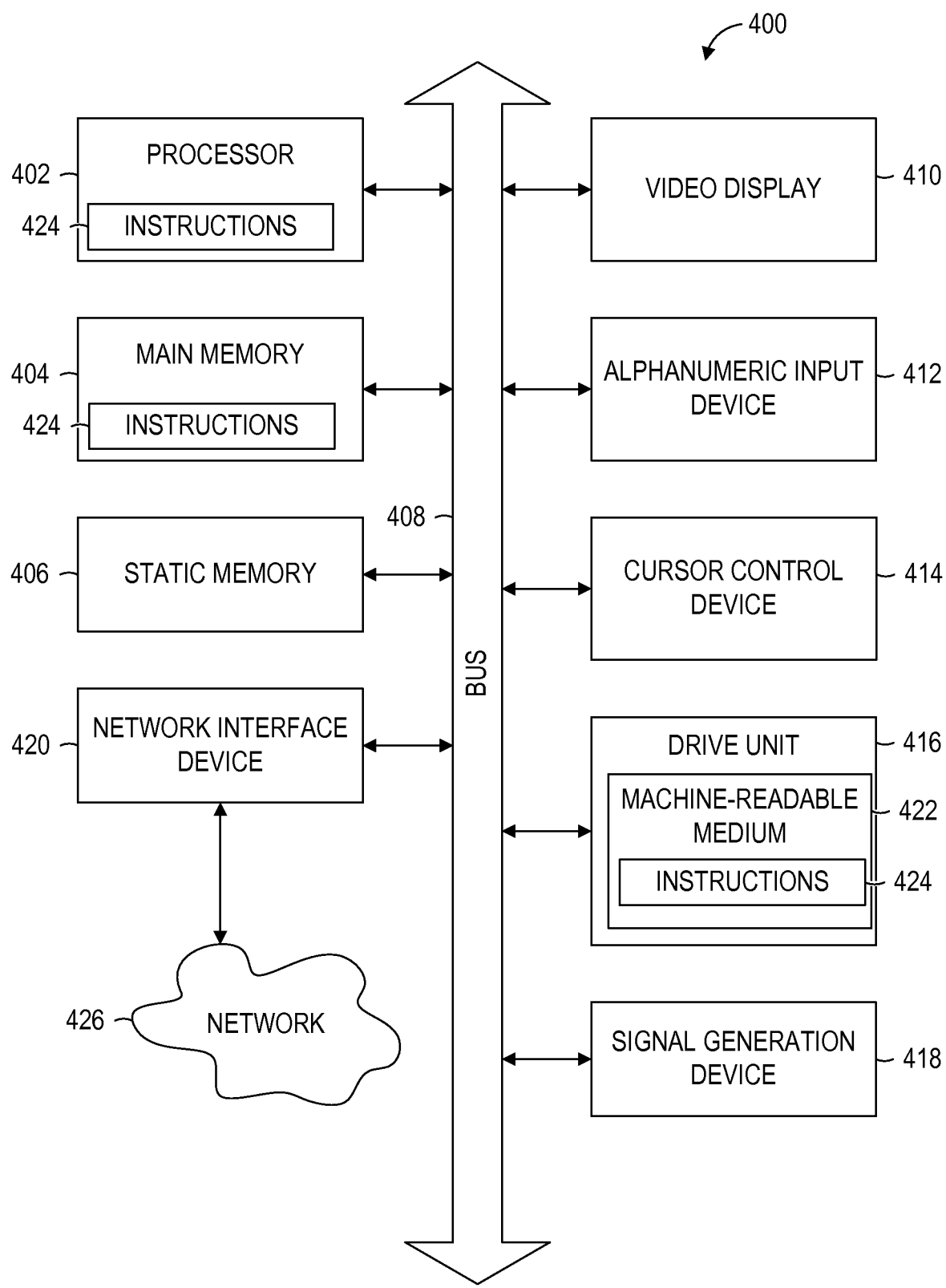
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 405. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to optimize search process in an on-line social network system has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
maintaining an inverted index that maps content terms to documents that include those content terms;
maintaining member profiles representing members in an on-line social network system, the member profiles including profile terms that characterize respective members of the on-line social networking system;
from the profile terms that characterize respective members of the on-line social networking system, selecting additional content terms based on how frequently the respective terms appear in the member profiles;
augmenting the inverted index with the additional content terms;
in the on-line social network system, detecting a search request from a member of the on-line social network system, the search request including one or more user-supplied terms;
from a member profile representing the member in the on-line social network system, using at least one processor, deriving one or more additional search terms, the one or more additional search terms representing respective characteristics of the member;
by utilizing the inverted index, processing the search request based on the one or more user-supplied terms and the one or more additional terms to produce one or more search results; and
causing display the one or more search results on a display device.

2. The method of claim 1, wherein the processing of the search request comprises applying a weighted OR operator to the one or more additional search terms.

3. The method of claim 1, wherein a first term from the one or more additional search terms is associated with a skills category, the skills category associated with phrases describing professional skills of respective members of the on-line social network system.

4. The method of claim 1, wherein a second term from the one or more additional search terms is associated with a location category, the location category associated with phrases describing geographic locations of respective members of the on-line social network system.

5. The method of claim 1, wherein a first term from the one or more additional search terms is assigned a first weight, a second term from the one or more additional search terms is assigned a second weight.

6. The method of claim 1, wherein a content term from the inverted search index is mapped to identifications a documents stored in the on-line social network system that explicitly includes the content term.

7. The method of claim 1, wherein a content term from the inverted search index is mapped to identifications a documents stored in the on-line social network system that implicitly includes the content term.

8. The method of claim 1, wherein items from the list of search results represent respective job postings stored in the on-line social network system.

9. A computer-implemented system comprising:
one or more processors; and
a non-transitory computer readable storage medium comprising instructions that when executed by the one or processors cause the one or more processors to perform operations comprising:
maintaining an inverted index that maps content terms to documents that include ose content terms;
maintaining member profiles representing members in an on-line social network system, the member profiles including profile terms that characterize respective members of the on-line social networking system;

from the profile terms that characterize respective members of the on-line social networking system, selecting additional content terms based on how frequently the respective terms appear in the member profiles;

augmenting the inverted index with the additional content terms;

in the on-line social network system, detecting a search request from a member of the on-line social network system, the search request including one or more user-supplied terms;

from a member profile representing the member in the on-line social network system, using at least one processor, deriving one or more additional search terms, the one or more additional search terms representing respective characteristics of the member;

by utilizing the inverted index, processing the search request based on the one or more user-supplied terms and the one or more additional terms to produce one or more search results; and causing display the one or more search results on a display device.

10. The system of claim 9, wherein the search results generator is to process the search request by applying a weighted OR operator to the one or more additional search terms.

11. The system of claim 9, wherein a first term from the one or more additional search terms is associated with a skills category, the skills category associated with phrases describing professional skills of respective members of the on-line social network system.

12. The system of claim 9, wherein a second term from the one or more additional search terms is associated with a location category, the location category associated with phrases describing geographic locations of respective members of the on-line social network system.

13. The system of claim 9, wherein a first term from the one or more additional search terms is assigned a first weight, a second term from the one or more additional search terms is assigned a second weight.

14. The system of claim 9, wherein a content term from the inverted search index is mapped to identifications a documents stored in the on-line social network system that explicitly includes the content term.

15. The system of claim 9, wherein a content term from the inverted search index is mapped to identifications a documents stored in the on-line social network system that implicitly includes the content term.

16. A machine-readable non-transitory storage medium having instruction data executable by a machine to cause the machine to perform operations comprising:

maintaining an inverted index that maps content terms to documents that include those content terms;

maintaining member profiles representing members in an on-line social network system, the member profiles including profile terms that characterize respective members of the on-line social networking system;

from the profile terms that characterize respective members of the on-line social networking system; selecting additional content terms based on how frequently the respective terms appear in the member profiles;

augmenting the inverted index with the additional content terms;

in the on-line social network system, detecting a search request from a member of the on-line social network system, the search request including one or more user-supplied terms;

from a member profile representing the member in the on-line social network system, using at least one processor, deriving one or more additional search terms, the one or more additional search terms representing respective characteristics of the member;

by utilizing the inverted index, processing the search request based on the one or more user-supplied terms and the one or more additional terms to produce one or more search results; and causing display the one or more search results on a display device.

* * * * *

UNITED STATES PATENT AND TRADEMARK OFFICE
CERTIFICATE OF CORRECTION

Page 1 of 1

PATENT NO. : 10,685,027 B2
APPLICATION NO. : 14/925828
DATED : June 16, 2020
INVENTOR(S) : Michael Chernyak It is certified that error appears in the above-identified patent and that said Letters Patent is hereby corrected as shown below:

On the Title Page

Item (56), in Column 2, under "Other Publications", Line 1, delete "PCT/U52016/058797," and insert --PCT/US2016/056797,-- therefor Item (56), in Column 2, under "Other Publications", Line 3, delete "PCT/U52016/056797," and insert --PCT/US2016/056797,-- therefor In the Claims In Column 10, Line 65, in Claim 9, delete "ose" and insert --those-- therefor In Column 12, Line 20, in Claim 16, delete "system;" and insert --system,-- therefor Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*